C. L. REDFIELD.
VEHICLE WHEEL.
APPLICATION FILED MAR. 19, 1913.
1,235,243.
Patented July 31, 1917.
2 SHEETS—SHEET 1.
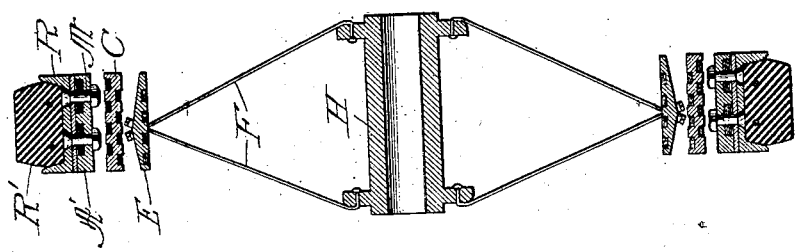
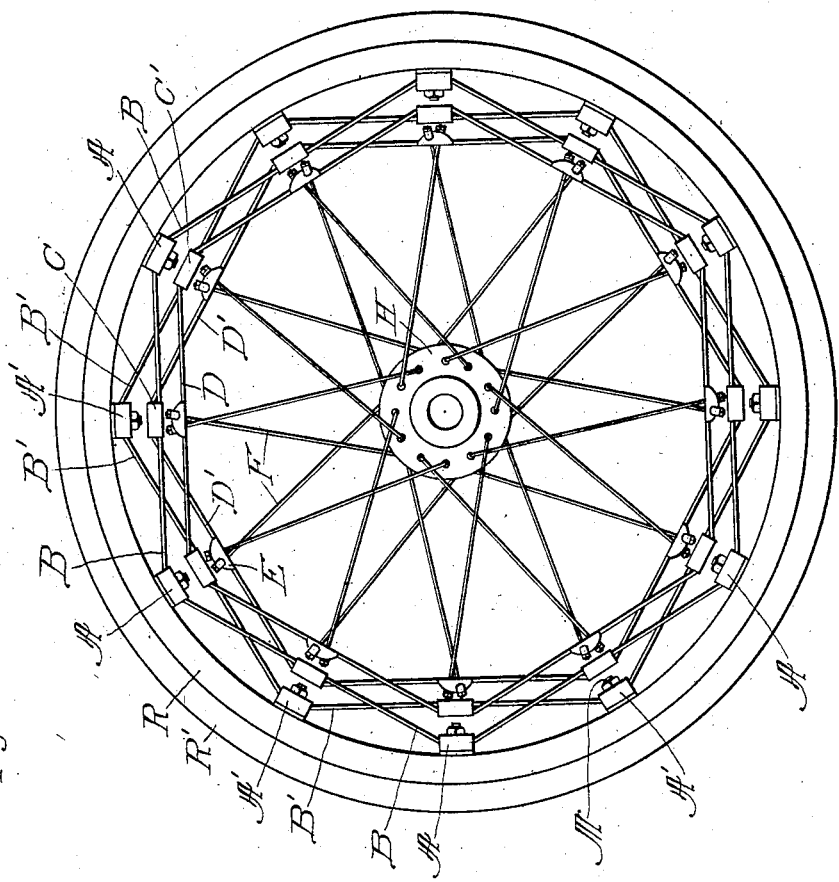
Witnesses:
Arthur W. Carson
Robert H. Weir
Inventor:
Casper L. Redfield C. L. REDFIELD.
VEHICLE WHEEL.
APPLICATION FILED MAR. 19, 1913.
1,235,243.
Patented July 31, 1917.
2 SHEETS—SHEET 2.
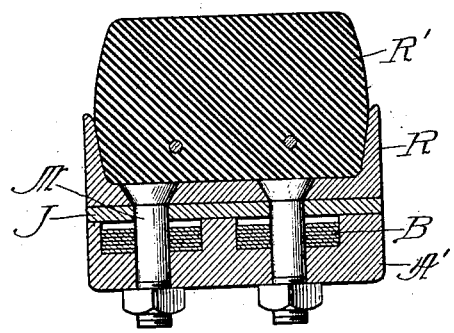
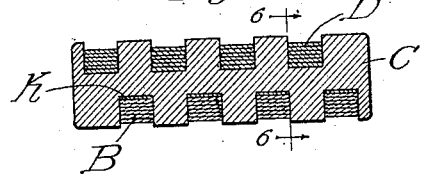
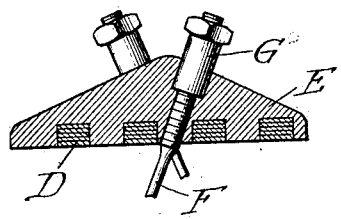
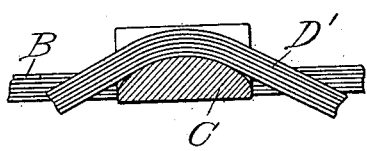
Witnesses:
Arthur W. Carlson
Robert H. Weir
Inventor
Casper L. Redfield

UNITED STATES PATENT OFFICE.

CASPER L. REDFIELD, OF CHICAGO, ILLINOIS.

VEHICLE-WHEEL.

1,235,243.  Specification of Letters Patent.  Patented July 31, 1917.

Application filed March 19, 1913. Serial No. 755,280.

*To all whom it may concern:*

Be it known that I, CASPER L. REDFIELD, a citizen of the United States of America, and a resident of Chicago, county of Cook, and State of Illinois, have invented certain new and useful Improvements in Vehicle-Wheels, of which the following is a specification.

My invention relates to vehicle wheels and has for its object improvements in devices of that character.

In the accompanying drawings my invention is illustrated as applied to a rubber-tired wheel, in which drawings—

Figure 1 is an elevation of the wheel;

Fig. 2 is a transverse section;

Figs. 3, 4 and 5 are enlarged sections of parts appearing in Fig. 2; and

Fig. 6 is a section on line 6—6 of Fig. 4.

In the said drawings, R is a rim of an ordinary steel channel in which is held the rubber tire $R^1$. Supported at uniform distances against the inner face of the rim R, and by means of bolts M, are brackets A and $A^1$ which are distinguished from each other by the cords which they support. Supported in grooves in the brackets A are cords B, and similarly supported in the brackets $A^1$ are the cords $B^1$. Each cord is composed of a plurality of strands, and each strand is composed of a plurality of sub-strands. In the drawings I have shown each cord as composed of four strands, each in a separate groove, and each strand is composed of a series of layers of metal ribbon piled upon each other so as to make laminated strands, and hence, laminated cords. The strands of the cords B are, for convenience, continuous strands, and the same is true of the cords $B^1$. A convenient way of forming the cords B is to mount the brackets A upon a reel and wind the ribbons upon them. The brackets may then be moved from the reel and secured to the rim R. By using a special reel the process may be made still simpler. Instead of using ribbon to make the strands I may make them of piano wire,—the grooves in the brackets serving to keep the strands and sub-strands in proper relationship to each other.

The brackets A and $A^1$ are arranged alternately on the rim R, and the grooves in the brackets A and $A^1$ are so placed that the strands of the cords B will pass through the spaces between the strands of the cords $B^1$. It will be obvious that by winding a greater or less number of layers of ribbon or wire in the grooves I may make the strands, and hence the cords, of any desired tensile strength. It will also be obvious that the ultimate strength of the cords may be varied by composing it of greater or less number of strands. By making the width of the strands equal to the diameter of the bolts M I am able to use the spaces between the strands for supporting the brackets from the rim. This is shown in Fig. 3.

Mounted upon each cord B, at the center thereof, is a saddle C, and at the center of each cord $B^1$ is a saddle $C^1$. The saddles C have grooves in their lower faces for receiving the strands of the cords B, and other grooves in their upper faces for receiving and supporting the strands of the cords $D^1$. Similarly, the saddles $C^1$ have grooves below for the strands of cords $B^1$, and grooves above for the strands of cords D. The cords D and $D^1$ are in every respect like the cords B and $B^1$ except for their length and the place at which they are located.

Mounted upon the centers of the cords D and $D^1$ are saddles E which are connected by means of tension spokes F to the hub H. The hub may be of any construction, and the manner of suspending a hub from outside supports is well known in the art and needs no particular description. The difference in this respect is that in the present case the outer points of suspension are upon the centers of cords under tension instead of directly from the wheel rim as heretofore.

The cords B, $B^1$, D and $D^1$ are initially under a light tension or may be a trifle slack according to the quality desired in the wheel. The greater the initial tension of the cords the greater will be the resilient action of the hub with respect to the rim, but the less will be the load the wheel will support for cords of a given strength. On the other hand, cords which are initially slack will support a greater load but will be less resilient. By the particular method by which the cords are constructed they may be made of any strength desired and hence they may be used under any desired initial tension. The cords under tension are like violin strings which may be deflected but which spring back into place when the lateral strain on them is released.

In Fig. 1 the cords are shown as straight between their supports. When, however, tension is put upon the spokes F by tightening the screws G, the cords D and D¹ will sag slightly at their centers. As these cords are supported upon other cords, these other cords B and B¹ will also sag. When a radial strain is put upon the hub H, the cords will yield as in the case of the violin string except that in this case the yield is through a series of cords.

Instead of mounting the saddles E upon the cords D and D¹, other cords may be supported from these points and the spokes be in turn supported from these other cords. Or the cords D and D¹ may be omitted and the spokes connected directly to saddles on the cords B and B¹. In the first case the wheel will be more resilient than that shown in the drawing, while in the second case it will be less so. The construction is thus adapted for any desired extension of the resilient character without any change other than the adding or taking away of parts. By reason of the fact that the spokes are under tension and are supported upon the cords which are also under tension, the wheel may be characterized as a compound suspension wheel.

Between the brackets A and A¹ and the rim R, are thin pieces J. These pieces are simply shims for adjusting the tension of the cords B and B¹ with respect to the rim. If, after the wheel has been used for a time, the cords B and B¹ become slack, these shims may be removed and thinner shims substituted for them. In Fig. 4 shims K are shown in the grooves over the strands of cord B and under the saddle C. By changing the thickness of these shims in saddles C and C¹ the tension of cords D and D¹ may be adjusted with respect to the tension of cords B and B¹. Changing a shim J under one bracket A affects the tension of all of the cords B, and as the operation of the device is not affected by small changes in the radial position of any particular bracket there is a plurality of points at which any particular kind of adjustment may be made, and the total adjustment is the sum of the individual adjustments. Also the tension of the cords D and D¹ may be adjusted at one or more of a plurality of points.

What I claim is

1. The combination with the rim and hub of a wheel, of a series of connected cords secured to the rim and subtending adjacent arcs for the entire circumference of the rim, a second series of connected cords secured to the rim at points between those at which the first series of cords are secured and subtending adjacent arcs for the entire circumference of the rim, and connections from the center of each cord to the hub.

2. The combination with the rim and hub of a wheel, of a series of attaching points secured to the inner face of the rim at equal distances from each other around the entire circumference of the rim, a series of cords secured to alternate attaching points, a second series of cords secured at the intermediate attaching points and crossing the first cords, and connections from the centers of the cords to the hub.

3. In a suspension wheel, a cord composed of a series of strands separated from each other by a distance substantially equal to the width of the strands, and a second similar cord crossing the first cord and having its strands passing through the spaces between the strands of the first cord.

4. In combination with the rim and hub of a wheel, a series of cords secured to the rim and subtending adjacent arcs for the entire circumference of the rim, each cord being composed of a series of strands separated from each other by spaces substantially equal to the width of the strands, other similar cords attached to intermediate points on the rim and crossing the first named cords by having their strands pass through the spaces before mentioned, and means for adjustably suspending the hub from the centers of said cords.

5. The combination with the rim and hub of a wheel, of a series of supports secured at uniform distances to the inner face of the rim, each support having a plurality of receiving grooves, a series of cords formed by winding metal ribbon or wire upon the supports and in their grooves so as to form composite cords made up of as many laminated strands as there are grooves in the supports, and connections from the hub to the cords.

6. The combination with the rim and hub of a wheel, of a series of cords connected to and supported by the rim, each cord consisting of a plurality of strands separated by spaces, a saddle mounted upon each cord, and connections from the hub to the saddles, the connections to each saddle passing through the spaces between two strands of the cord upon which the saddle is mounted.

7. The combination with the rim and hub of a wheel, of a series of cords having their ends connected to the rim, each cord consisting of a plurality of strands separated by spaces, a saddle mounted upon each cord, other similar cords connected to the saddles and having their strands passing through the spaces between the strands of the first mentioned cords, and connections from the last named cords to the hub.

8. The combination with a wheel rim, and a series of cords, said rim and cords forming the compression and tension members respectively of a truss, and said cords crossing each other so that the effective spans of the compression member are less than the length of the cords, of a wheel hub connected to and supported on the centers of said cords.

Signed at Chicago, Illinois, this 17th day of March, 1913.

CASPER L. REDFIELD.

Witnesses:
WALTER H. REDFIELD,
JOSEPH T. SIMPSON.

Copies of this patent may be obtained for five cents each, by addressing the "Commissioner of Patents, Washington, D. C."